United States Patent
Kuhl et al.

(10) Patent No.: US 12,362,639 B2
(45) Date of Patent: Jul. 15, 2025

(54) ELECTRICAL RADIAL FLOW MACHINE AND POWERTRAIN

(71) Applicant: Schaeffler Technologies AG & Co. KG, Herzogenaurach (DE)

(72) Inventors: Dennis Kuhl, Bühl (DE); Holger Witt, Bühl (DE); Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 374 days.

(21) Appl. No.: 18/007,525

(22) PCT Filed: May 3, 2021

(86) PCT No.: PCT/DE2021/100393
§ 371 (c)(1),
(2) Date: Dec. 1, 2022

(87) PCT Pub. No.: WO2021/244695
PCT Pub. Date: Dec. 9, 2021

(65) Prior Publication Data
US 2023/0216388 A1    Jul. 6, 2023

(30) Foreign Application Priority Data
Jun. 4, 2020   (DE) .......................... 102020114856.9

(51) Int. Cl.
*H02K 21/02*   (2006.01)
(52) U.S. Cl.
CPC ....... *H02K 21/027* (2013.01); *H02K 2213/09* (2013.01)

(58) Field of Classification Search
CPC .... H02K 21/027; H02K 2213/09; H02K 7/12; H02K 11/24; H02K 21/022; H02K 21/025; H02K 21/024; H02K 21/023; Y02T 10/72
See application file for complete search history.

(56) References Cited

U.S. PATENT DOCUMENTS

| | | |
|---|---|---|
| 8,109,847 B2 | 2/2012 | Rueschel |
| 2007/0241628 A1 | 10/2007 | Mann et al. |

(Continued)

FOREIGN PATENT DOCUMENTS

| | | |
|---|---|---|
| CN | 103346639 | 10/2013 |
| DE | 102008059300 | 6/2009 |

(Continued)

OTHER PUBLICATIONS

English translation of JP-2007244023-A (Year: 2007).*
English translation of JP-2014150616-A (Year: 2014).*

*Primary Examiner* — Tulsidas C Patel
*Assistant Examiner* — Joshua Kiel M Rodriguez
(74) *Attorney, Agent, or Firm* — Volpe Koenig (57) ABSTRACT

An electric radial flow machine having a stator, a rotor body connected to a rotor shaft, and a spring element which applies a spring force to the rotor body in the axial direction such that in a first operating position, the rotor body is held in an axial position in which the overlap between opposing surfaces of the rotor body and the stator is less than 100%. A displacement device with first and second displacement elements generates an axial movement between the rotor body and the stator against the spring force using a torque produced between the rotor shaft and the rotor body so that in the event of a rotation of the first displacement element relative to the second displacement element or vice versa, the rotor body is pushed on the rotor shaft axially against the spring force.

18 Claims, 5 Drawing Sheets

(56) References Cited

U.S. PATENT DOCUMENTS

2008/0106162 A1* 5/2008 Naitou ................. H02K 21/026
                                                              310/78
2008/0265702 A1    10/2008 Yeh

FOREIGN PATENT DOCUMENTS

| DE | 102009038928 | | | 11/2010 | |
|----|----|----|----|----|----|
| DE | 102017209174 | | | 12/2018 | |
| DE | 102017216508 | | | 3/2019 | |
| EP | 1401087 | | | 3/2004 | |
| EP | 2197090 | | | 6/2010 | |
| EP | 2306621 | | | 4/2011 | |
| EP | 3358723 | | | 8/2018 | |
| JP | 2007244023 | A | * | 9/2007 | |
| JP | 2009208195 | | | 9/2009 | |
| JP | 2014150616 | A | * | 8/2014 | ........... H02K 21/024 |
| WO | 2005008865 | | | 1/2005 | |
| WO | WO-2019050642 | A1 | * | 3/2019 | ........... E04D 13/076 |

* cited by examiner

ELECTRICAL RADIAL FLOW MACHINE AND POWERTRAIN

CROSS-REFERENCE TO RELATED APPLICATIONS

This application is the U.S. National Phase of PCT Appln. No. PCT/DE2021/100393, filed May 3, 2021, which claims the benefit of German Patent Appln. No. 10 2020 114 856.9, filed Jun. 4, 2020, the entire disclosures of which are incorporated by reference herein.

TECHNICAL FIELD

The present disclosure relates to an electric radial flow machine, designed as a permanently excited synchronous machine, comprising a stator and a rotor body which is connected to a rotor shaft, and a spring element, which applies a spring force to the rotor body in the axial direction, such that in a first operating position, the rotor body is held in an axial position in which an overlap between opposing surfaces of the rotor body and the stator is less than 100%. Furthermore, a displacement device is provided, which is designed to generate an axial movement between the rotor body and the stator on the basis of a torque produced between the rotor shaft and the rotor body against the spring force. In addition, the disclosure relates to a powertrain for a motor vehicle.

BACKGROUND

Electric radial flow machines are already well known in the prior art.

DE 10 2009 038 928 A1 discloses an electric motor having a stator, a rotor, and an air gap formed between the stator and the rotor. The size of the air gap is variable on the basis of the speed of the electric motor, wherein the air gap is enlarged at higher speeds of the rotor. The air gap is enlarged by axial sliding of the rotor or stator.

SUMMARY

The object is to provide an electric radial flow machine which is optimized with a view to torque-dependent amplification of the magnetic field. Furthermore, the object is to provide a powertrain for a motor vehicle that can be driven by an electric motor, in which the electric drive machine is improved with regard to the torque-dependent amplification of the magnetic field. In particular, an electric radial flow machine is to be created with an operating behavior that is optimized in operating phases with different torques.

This object is achieved by an electric radial flow machine having one or more of the features disclosed herein and by a powertrain for a motor vehicle that can be driven by an electric motor having one or more of the features disclosed herein.

An electric radial flow machine designed according to the disclosure, designed as a permanently excited synchronous machine, comprises a stator and a rotor body connected to a rotor shaft, and a spring element, which applies a spring force to the rotor body in the axial direction, such that in a first operating position, the rotor body is held in an axial position in which an overlap between opposing surfaces of the rotor body and the stator is less than 100%. Furthermore, the radial flow machine comprises at least one displacement device which is designed to generate an axial movement between the rotor body and the stator on the basis of a torque produced between the rotor shaft and the rotor body against the spring force. The at least one displacement device has a first displacement element, a second displacement element, and at least one rolling element arranged between the first displacement element and the second displacement element, wherein the first displacement element is connected to the rotor body, in particular in a manner fixed against rotation and sliding, and is arranged on the axially non-slidable rotor shaft in an axially slidable and rotatable manner (if necessary, limited rotatability), and the second displacement element is non-rotatably and non-slidably connected to the rotor shaft. In addition, the first displacement element has a first ramp element on the side thereof facing the second displacement element, and the second displacement element has a second ramp element on the side thereof facing the first displacement element, wherein the first ramp element and the second ramp element are designed in such a way that in the event of a rotation of the first displacement element against the second displacement element or vice versa, the rotor body is pushed axially on the rotor shaft against the spring force. This achieves the advantage that a torque-dependent field reinforcement of the electric radial flow machine can be ensured with structurally simple means. An additional active actuator for sliding the rotor and/or stator is not required. Rather, the energy required for the axial sliding of the rotor body on the rotor shaft is obtained from the rotational energy of the electric machine itself and automatically converted into a sliding force for the rotor body on the basis of the torque.

First, the individual elements disclosed herein are explained in the order in which they are named in the set of claims and particularly preferred embodiments of the subject matter of the disclosure are described below.

Electric machines are used to convert electrical energy into mechanical energy and/or vice versa, and generally include a stationary part referred to as a stator, stand, or armature, and a part referred to as a rotor or runner, and arranged movably relative to the stationary part.

In the case of electric machines designed as rotation machines, a distinction is made in particular between radial flow machines and axial flow machines. A radial flow machine is characterized in that the magnetic field lines extend in the radial direction in the air gap formed between rotor and stator, while in the case of an axial flow machine the magnetic field lines extend in the axial direction in the air gap formed between rotor and stator.

The stator of a radial flow machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are let into the electrical lamination running parallel to the rotor shaft and accommodate the stator winding or parts of the stator winding. On the basis of the construction towards the surface, the slots can be closed with locking elements such as locking wedges or covers or the like to prevent the stator winding from being detached.

A rotor is the rotating (spinning) part of an electric machine. In particular, a rotor is used when there is also a stator.

A rotor body is generally understood to mean the rotor without a rotor shaft. The rotor body is therefore composed in particular of the laminated rotor core and the magnetic elements introduced into the pockets of the laminated rotor core or fixed circumferentially to the laminated rotor core and any axial cover parts present for closing the pockets, and the like.

A laminated rotor core is understood to mean a plurality of laminated individual laminations or rotor laminations, which are generally made from electrical sheet metal and are stacked and packaged one on top of the other to form a stack, what is termed the laminated rotor core. The individual laminations can then remain held together in the laminated core by gluing, welding, or screwing.

The permanent magnets to be introduced into the pockets of the laminated rotor core are understood as magnetic elements. A single larger magnetic element designed as a bar magnet or several smaller permanent magnet elements can be provided for each pocket. Alternatively, the magnetic elements can also be distributed over the outer or inner circumferential rotor body surface facing the air gap between the stator and the rotor.

Further advantageous embodiments are specified in the dependent claims. The features listed individually in the dependent claims can be combined with one another in a technologically meaningful manner and can define further embodiments according to the disclosure. In addition, the features indicated in the claims are specified and explained in more detail in the description, wherein further preferred embodiments are shown.

According to an advantageous embodiment, it can be provided that the spring element is dimensioned in terms of the spring force thereof in such a way that, when the radial flow machine is at rest, the rotor body and the stator can be spaced apart by the spring force by a predetermined maximum axial distance from one another when the magnetic attraction force that exists between them is overcome. The distance is dimensioned such that the overlap of the opposing surfaces of the rotor body and stator is at least 20% and at most 80%, preferably at least 30% and at most 70% and particularly preferably at least 40% and at most 60%. The advantage of this configuration is that, starting from an overlap for an operating state with low torque requirements, on the basis of an increasing torque, operating states with adapted field strengthening can be set steplessly, can be adjusted up to an operating state with 100% overlap of the rotor and stator surfaces in which a maximum field strengthening is given.

According to a further preferred development according to the disclosure, it can also be provided that the spring element is dimensioned in terms of the spring force thereof and the displacement device is designed in such a way that in an operating state of the radial flow machine in which a maximum predetermined torque is reached, the rotor body is pushed axially against the spring force so that the overlap of the opposing surfaces of the rotor body and the stator is 100%. A stop is advantageously provided, which is designed and arranged in such a way that the rotor body transmits the torque thereof to the rotor shaft via the stop in the operating state of the maximum torque. The advantageous effect of this configuration is based on the fact that on the one hand a stepless field strength adjustment is provided with increasing torque and that when the operating state with maximum torque is reached, this is transmitted via a stop provided for this purpose to limit the rotation of the rotor body on the rotor shaft instead of via the displacement means. In this way, wear-promoting forces can be kept away from the displacement means.

According to a further particularly preferred embodiment, it can be provided that the spring element is supported against the stop, wherein the stop is arranged on the rotor shaft in a non-slidable manner, which results in a structurally simple and space-saving solution. At the same time, the stop can also be used to limit the axial sliding path.

Furthermore, the disclosure can also be further developed such that the spring element is designed as a compression spring, in particular as a combination of a leaf spring assembly and a plate spring element acting parallel thereto, or as a spring acting on torsion, whereby a space-saving arrangement can be provided.

In a likewise preferred embodiment variant according to the disclosure, it can also be provided that the first displacement element has at least three first ramp elements and the second displacement element has at least three second ramp elements which are arranged and configured to correspond to the first ramp elements, thereby providing a construction that is geometrically optimized for force transmission. Advantageously, the ramp elements are each formed in pairs in such a way as to enable rotation in both directions of rotation of the rotor. As a result, the mechanically constructively implemented, torque-dependent field reinforcement can be provided for both directions of rotation of the electric machine.

In addition, the object on which the disclosure is based is achieved by an electric radial flow machine, designed as a permanently excited synchronous machine and comprising a stator and a stationary stator holder, and—a rotor body connected to a rotor shaft, a spring element, which applies a spring force to the stator in the axial direction such that the stator is held in a first operating position in an axial position in which a radial overlap between the surfaces of the rotor body and the stator arranged opposite one another is less than 100%, and a displacement device which is designed to generate an axial movement between the stator and stator holder on the basis of a supporting moment against the spring force produced between the stator and the stationary stator holder. It is provided that the displacement device has a first displacement element, a second displacement element and at least one rolling element arranged between the first displacement element and the second displacement element, and the first displacement element is connected to the stator and is arranged on the stationary stator holder such that it can be slid and rotated axially, and the second displacement element is non-rotatably and non-slidably connected to the stationary stator holder, and wherein the first displacement element has a first ramp element on the side thereof facing the second displacement element and the second displacement element has a second ramp element on the side thereof facing the first displacement element, wherein the first ramp element and the second ramp element are designed such that in the event of a rotation of the first displacement element against the second displacement element or vice versa, the stator is pushed axially relative to the stationary stator holder against the spring force. An alternative design solution is hereby specified, in which the axial sliding between the rotor and stator is made possible solely or partially additionally by a displacement device arranged between the stator body and the stationary stator holder.

Advantageously, the radial flow machine is designed according to the disclosure, wherein the necessary axial sliding between the rotor and stator then takes place proportionally by a displacement device between the rotor body and rotor shaft and proportionally by a displacement device between the stator body and the stator holder.

The radial flow machine can also be designed in such a way that the rotor body has a conical shape and the stator body has a corresponding interior space for accommodating the conically designed rotor body.

Furthermore, it is also conceivable that the rotor of an electric radial flow machine with a cylindrically designed rotor body is designed in two parts and has a first rotor body and a second rotor body, wherein a spring force is applied to the rotor bodies via a spring element arranged axially therebetween in the axial direction outwards from the stator body.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so explanations from other figures can also be used.

In the figures.

DETAILED DESCRIPTION

Figure 1:
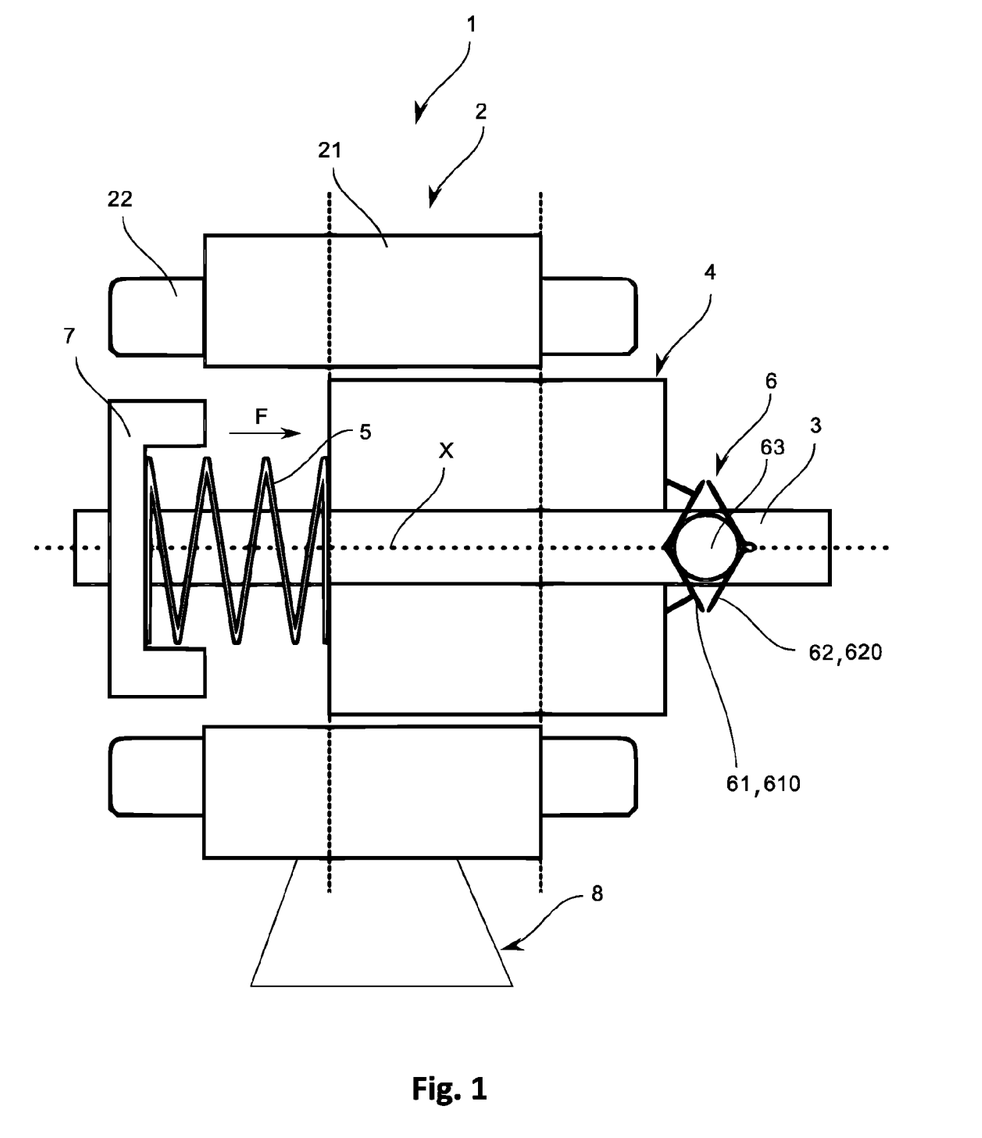
FIG. 1 shows a first embodiment of a radial flow machine according to the disclosure in an operating state with low torque, in an axial section in a schematic representation.
Figure 2:
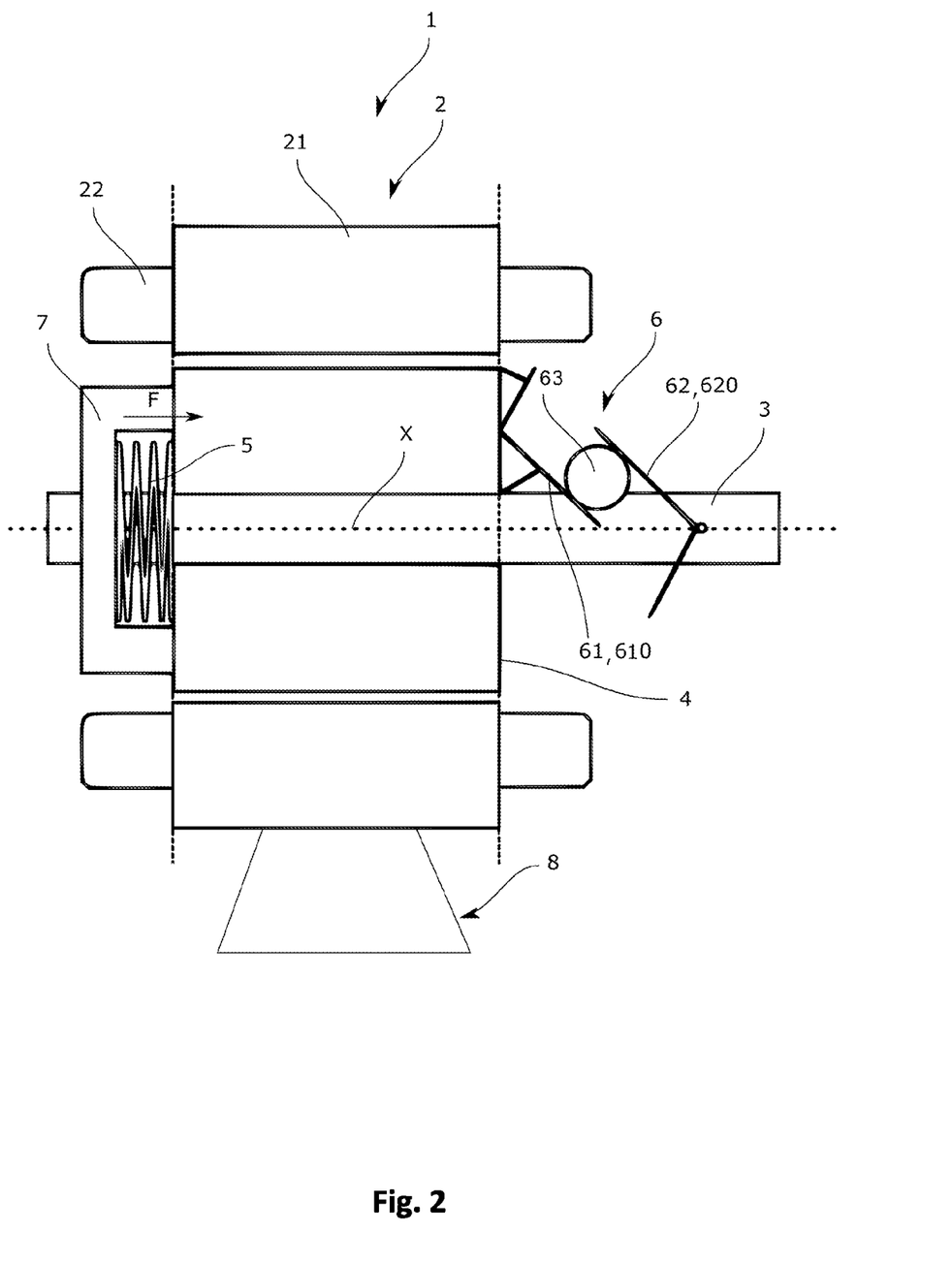
FIG. 2 shows the radial flow machine according to FIG. 1 in an operating state with maximum torque.

FIG. 1 shows a first embodiment of a radial flow machine 1 according to the disclosure in an operating state with low torque, in an axial section in a schematic representation. FIG. 2 shows the same radial flow machine in an operating state with maximum torque.

The electric radial flow machine 1 shown is designed as a permanently excited internal rotor synchronous machine and comprises a stator 2, a rotor body 4 connected to a rotor shaft 3, and a spring element 5, which applies a spring force F to the rotor body 4 in the axial direction, such that the rotor body 4 is held in the first operating position thereof, shown in FIG. 1, in an axial position in which an overlap between opposing surfaces of the rotor body 4 and the stator 2 is less than 100%. In the example shown, the rotor body 4 is pushed out laterally from the stator body 21 by approximately one third of the axial length thereof. The rotor body 4 is acted upon on one axial side by means of a spring element 5 against a stop 7 fixedly arranged on the rotor shaft 3 by applying a spring force F acting away from the stop 7, and is held in the rest position shown against a magnetic attraction force between the rotor body 4 and the stator body 21. On the axial side of the rotor body 4 opposite the stop 7, the latter is held in a limited manner in the axial sliding path thereof by a displacement element 6. If a specific torque (between the rotor body 4 and the rotor shaft 3) is now reached during operation of the electric radial flow machine 1 and is detected by means of the displacement device, this begins to press the rotor body 4 against the spring force F in the direction of the stop 7 into the stator body 21, so that the amount of overlap of the opposing surfaces of the rotor body 4 and stator 2 is increased and the field strength of the electric radial flow machine 1 is increased. As the torque increases, the rotor s tat-body 4 is pushed further and further into the stator body 21 until the opposing surfaces of the rotor body 4 and the stator body 21 finally overlap by 100%, as shown in FIG. 2. In this position shown in FIG. 2, in an operating state of maximum torque, the torque is transmitted between the rotor shaft 3 and the rotor body 4 via the stop 7, which forms a form-fitting connection with the rotor body 4 around the circumference for this purpose.

The displacement device 6, which is designed to generate an axial movement between the rotor body 4 and the stator 2 on the basis of a torque produced between the rotor shaft 3 and the rotor body 4 against the spring force F, has a first displacement element 61, a second displacement element 62 and at least one rolling element 63 arranged between the first displacement element 61 and the second displacement element 62. The first displacement element 61 is connected to the rotor body 4 in a rotationally and non-slidably fixed manner and is arranged in an axially slidable and limitedly rotatable manner on the rotor shaft 3, which is arranged in an axially non-slidable manner. The second displacement element 62, on the other hand, is connected to the rotor shaft 3 in a rotationally fixed and non-slidable manner. For the purpose of displacement, the first displacement element 61 has a first ramp element 610 on the side thereof facing the second displacement element 62 and the second displacement element 62 has a second ramp element 620 on the side thereof facing the first displacement element 61, wherein the first ramp element 610 and the second ramp element 620 are designed in such a way that if the first displacement element 61 rotates against the second displacement element 62 or vice versa, the rotor body 4 is pushed axially on the rotor shaft 3 against the spring force F. The first displacement element 61 and the second displacement element 62, designed to correspond therewith, are designed in such a way that mutual rotation in both directions of rotation is enabled. For this purpose, the ramp elements 610, 620 of the two displacement elements 61, 62 are designed in pairs.

Figure 3:
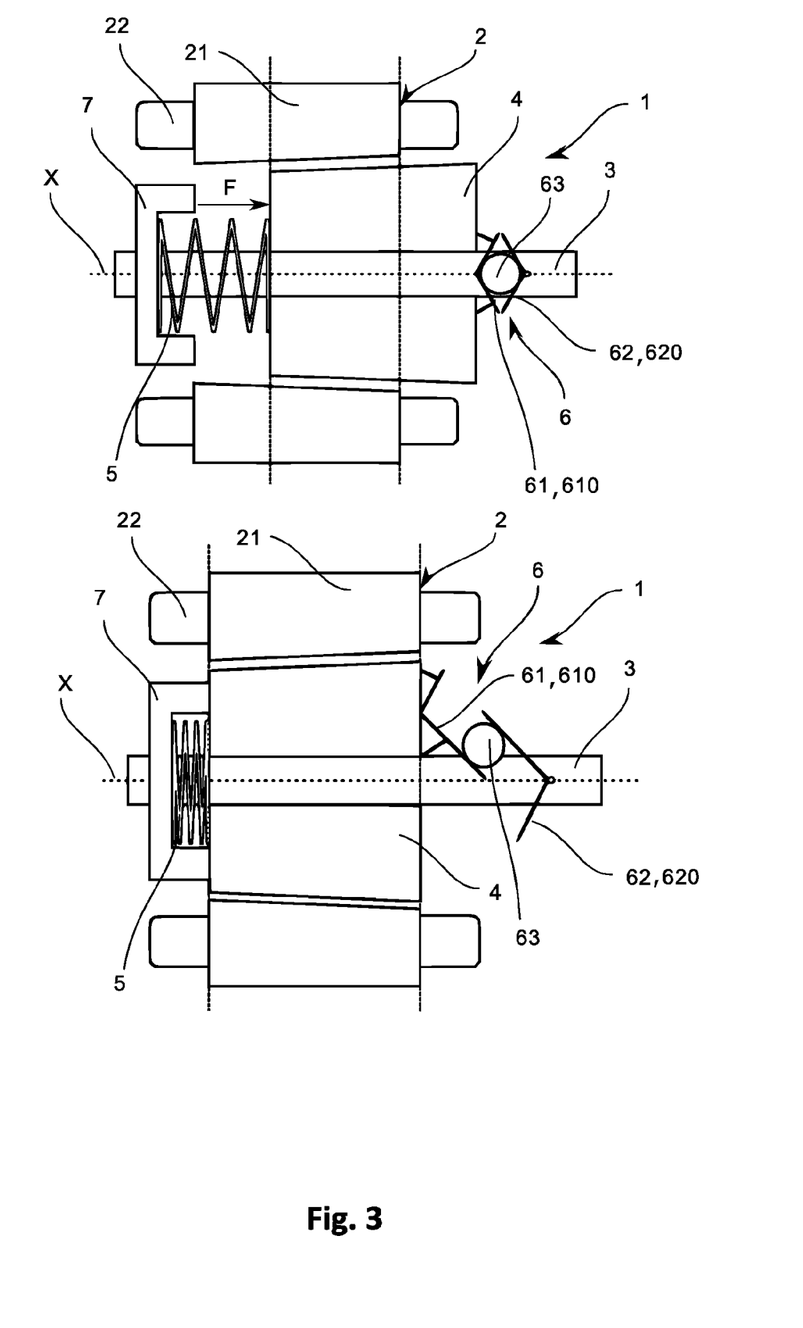
FIG. 3 shows a second embodiment of a radial flow machine according to the disclosure in different operating states—above, in an operating state with low torque and below, in an operating state with maximum torque, in an axial section in a schematic representation.

FIG. 3 shows in an axial section in a schematic representation a second embodiment of a radial flow machine 1 according to the disclosure in different operating states—above, in an operating state with low torque (similar to FIG. 1), and below, in an operating state with maximum torque (similar to FIG. 2). The radial flow machine shown is also constructed as a permanently excited machine and as an internal rotor. In contrast to the radial flow machine 1 according to FIGS. 1 and 2, the radial flow machine 1 shown in FIG. 3 is constructed with a conical rotor body 4 and a stator body 21 of corresponding design. The principle of action according to the disclosure applies analogously to this embodiment, which is why reference is made at this point to the description with regard to FIGS. 1 and 2.

Figure 4:
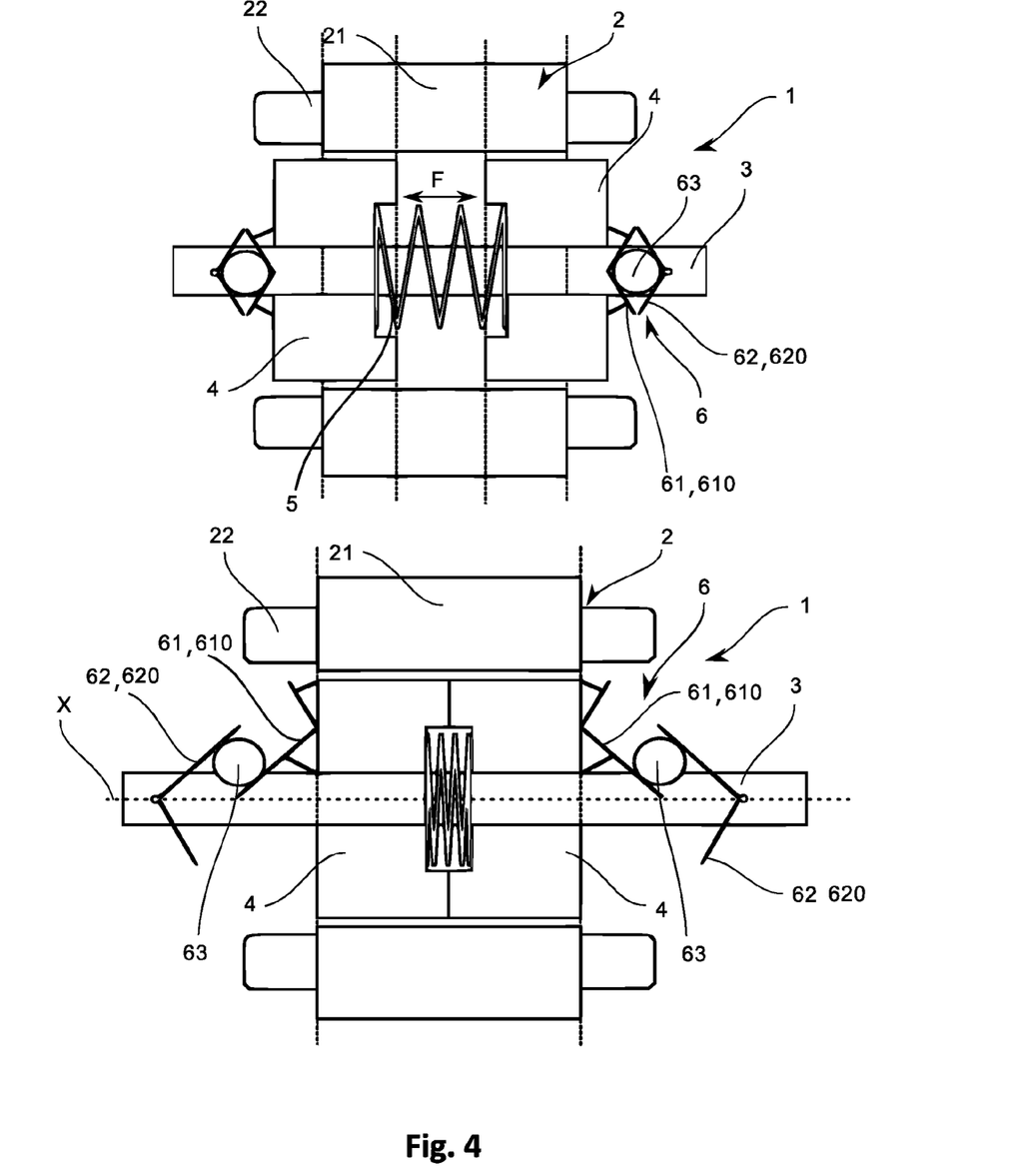
FIG. 4 shows a third embodiment of a radial flow machine according to the disclosure in different operating states—above, in an operating state with low torque and below, in an operating state with maximum torque, in an axial section in a schematic representation.

FIG. 4 shows a third embodiment of the radial flow machine according to the disclosure in different operating states. The electric radial flow machine 1 is shown in an operating state with a low torque in the upper representation and in an operating state with a maximum torque in the lower representation. The representations each show the radial flow machine 1 in an axial section in a schematic representation. The embodiment presented here also shows a radial flow machine 1 constructed as a permanently excited machine and as an internal rotor. The radial flow machine 1 shown in FIG. 4 shows a structure similar to that in FIGS. 1 and 2. Here, too, a stator body 21 is provided with a circular-ring-cylindrical receptacle for a circular-ring-cylindrical rotor body 4. In contrast to the embodiment according to FIG. 1, the rotor body 4 is designed in two parts, wherein the spring element 5 designed as a compression spring is arranged between the two rotor bodies 4, which pushes the two rotor bodies 4 supported outwards against one another. In an operating state with low torque or in an idle state of the electric radial flow machine 1, the two rotor bodies 4 are pushed out of the stator body 21 laterally at opposite axial ends and are limited in the displacement path thereof to the outside via displacement elements 62 of the displacement device 6 that are arranged laterally outside on the rotor shaft 3. As the torque increases, the two stator bodies 4 are pressed further and further into the stator body 21 by the displacement means 6 against the spring force F until finally the opposing surfaces of the rotor bodies 4 and the stator body 21 overlap by 100% is achieved as shown in the lower illustration in FIG. 4.

Figure 5:
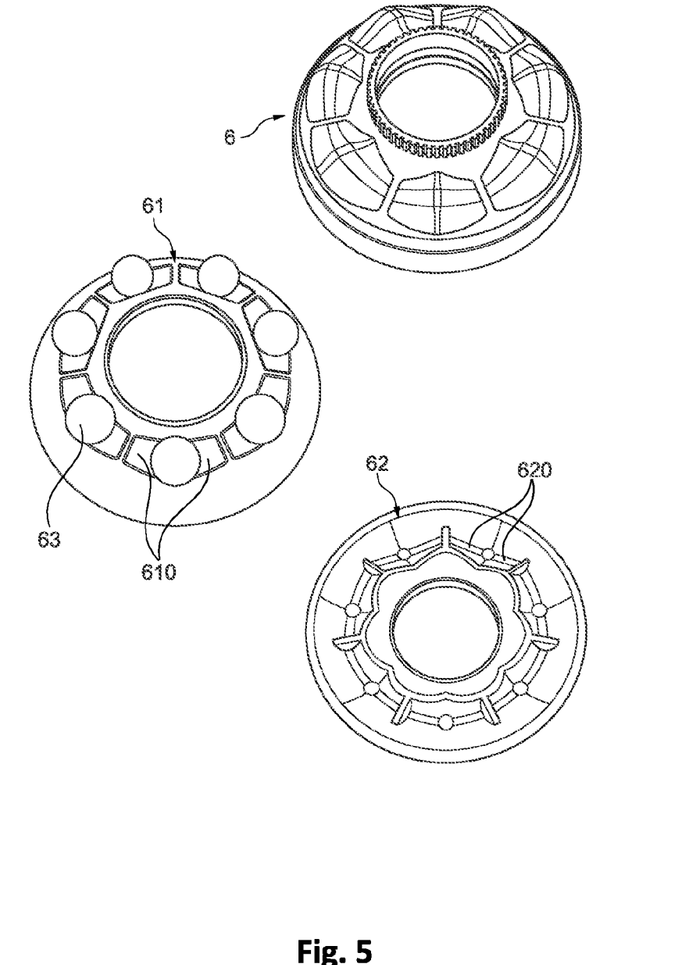
FIG. 5 shows a displacement device in three different representations—top in a perspective view of the closed overall unit—in the middle the first displacement element with rolling elements in a perspective view—bottom the second displacement element in a perspective view.

FIG. 5 shows a displacement device 6 in three different representations. In the upper illustration, the displacement device 6 is shown in a perspective view of the closed overall unit. In this case, the first displacement element 61 and the second displacement element 62 each form a housing half, which are connected to form a housing that encloses rolling elements 63 designed as balls. In the exemplary embodiment shown, a total of seven rolling elements 63 are housed between seven pairs of ramp elements of the ramp elements 610, 620. In the middle illustration, the first displacement element 61 with rolling elements 63 is shown from the inside in a perspective view. In the illustration below, the second displacement element 62 is shown from the inside in a perspective view. In the two interior views, the corresponding pairs of ramp elements 610, 620 can be seen particularly well.

The rolling elements 63 designed as balls are housed in the first displacement element 61 in a recess which defines a rest or central position of the displacement device. Only when a predetermined torque is exceeded between the first displacement element 61 (connected to the rotor body 4) and the second displacement element 62 (connected to the rotor shaft 3) are the displacement elements 61, 62 rotated in relation to one another, and due to the geometries of the ramp elements 610, 620 and the arranged between them rolling elements 63, are pushed apart.

The disclosure is not limited to the embodiments shown in the figures. The above description is therefore not to be regarded as restrictive, but rather as explanatory. The following claims are to be understood as meaning that a named feature is present in at least one embodiment of the disclosure. This does not exclude the presence of further features. If the patent claims and the above description define "first" and "second" features, this designation serves to distinguish between two features of the same type without defining an order of precedence.

LIST OF REFERENCE SYMBOLS

1 Electric radial flow machine
2 Stator
21 Stator body
22 Stator winding
3 Rotor shaft
4 Rotor body
5 Spring element
6 Displacement device
61 First displacement element
610 First ramp element
62 Second displacement element
620 Second ramp element
63 Rolling element
7 Stop
8 Stator holder
F Spring force
X Axis of rotation

The invention claimed is:

1. An electric radial flow machine formed as a permanently excited synchronous machine, comprising:
a stator;
a rotor body connected to a rotor shaft;
a spring element which applies a spring force to the rotor body in an axial direction such that in a first operating position, the rotor body is held in an axial position in which an overlap between opposing surfaces of the rotor body and the stator is less than 100%;
at least one displacement device configured to generate an axial movement between the rotor body and the stator based on a torque produced between the rotor shaft and the rotor body against the spring force;
the at least one displacement device has a first displacement element, a second displacement element, and at least one rolling element arranged between the first displacement element and the second displacement element;
the first displacement element is connected to the rotor body and is axially slidable and rotatable at least in certain areas on the rotor shaft, which is arranged so that the rotor shaft cannot be slid axially;
the second displacement element is connected to the rotor shaft in a rotationally and slidably fixed manner;
the first displacement element on a side facing the second displacement element has a first ramp element and the second displacement element has a second ramp element on a side thereof facing the first displacement element; and
the first ramp element and the second ramp element are configured such that upon a rotation of the first displacement element relative to the second displacement element or vice versa, the rotor body is pushed on the rotor shaft axially against the spring force.

2. The radial flow machine according to claim 1, wherein the spring element is dimensioned with the spring force such that, when the radial flow machine is at rest, the rotor body and the stator are spaced apart by the spring force when overcoming a magnetic attraction force existing between the rotor body and the stator by a predetermined maximum axial distance d from one another, and the distance d is dimensioned such that the overlap of the opposing surfaces of the rotor body and stator is at least 20% and at most 80%.

3. The radial flow machine according to claim 1, wherein the spring element is dimensioned with the spring force and the displacement device is configured such that when the radial flow machine is in an operating state in which a maximum predetermined torque is reached, the rotor body is pushed axially against the spring force so that the overlap of the opposing surfaces of the rotor body and stator is one hundred percent.

4. The radial flow machine according to claim 1, further comprising a stop arranged such that the rotor body transmits its torque via the stop to the rotor shaft in an operating state of maximum torque.

5. The radial flow machine according to claim 4, wherein the spring element is supported against the stop, and the stop is non slidably arranged on the rotor shaft.

6. The radial flow machine according to claim 1, wherein the spring element comprises a compression spring, a combination of a leaf spring assembly and a plate spring element acting parallel thereto, or a torsion spring.

7. The radial flow machine according to claim 1, wherein the first displacement element has at least three of the first ramp elements and the second displacement element has at least three of the second ramp elements which correspond to the first ramp elements.

8. The radial flow machine according to claim 1, wherein the rotor body is conical and the stator body has a corresponding interior space for receiving the conical rotor body.

9. The radial flow machine according to claim 1, wherein the rotor comprises a first rotor body and a second rotor body.

10. An electric radial flow machine formed as a permanently excited synchronous machine, comprising:
  a stator;
  a rotor body connected to a rotor shaft for rotation within the stator;
  a spring which applies a spring force to the rotor body in an axial direction such that in a first operating position, the rotor body is held in an axial position in which an overlap between opposing surfaces of the rotor body and the stator is less than 100%;
  a displacement device configured to generate an axial movement between the rotor body and the stator based on a torque produced between the rotor shaft and the rotor body against the spring force;
  the displacement device has a first displacement element, a second displacement element, and at least one rolling element arranged between the first displacement element and the second displacement element;
  the first displacement element is connected to the rotor body and is axially slidable and rotatable at least in certain areas on the rotor shaft, which is arranged so that the rotor shaft cannot be slid axially; the second displacement element is connected to the rotor shaft in a rotationally and slidably fixed manner;
  the first displacement element on a side facing the second displacement element has pairs of first ramp elements and the second displacement element has pairs of second ramp elements on a side thereof facing the first displacement element; and
  the pairs of first ramp elements each meet to form a roller element receiving depression and the pairs of second ramp elements each meet to form an opposing roller receiving depression, and upon a rotation of the first displacement element relative to the second displacement element or vice versa, the rotor body is pushed on the rotor shaft axially against the spring force.

11. The radial flow machine according to claim 10, wherein the spring element is dimensioned with the spring force such that, when the radial flow machine is at rest, the rotor body and the stator are spaced apart by the spring force when overcoming a magnetic attraction force existing between the rotor body and the stator by a predetermined maximum axial distance d from one another, and the distance d is dimensioned such that the overlap of the opposing surfaces of the rotor body and stator is at least 20% and at most 80%.

12. The radial flow machine according to claim 10, wherein the spring element is dimensioned with the spring force and the displacement device is configured such that when the radial flow machine is in an operating state in which a maximum predetermined torque is reached, the rotor body is pushed axially against the spring force so that the overlap of the opposing surfaces of the rotor body and stator is one hundred percent.

13. The radial flow machine according to claim 10, further comprising a stop arranged such that the rotor body transmits its torque via the stop to the rotor shaft in an operating state of maximum torque.

14. The radial flow machine according to claim 13, wherein the spring element is supported against the stop, and the stop is non slidably arranged on the rotor shaft.

15. The radial flow machine according to claim 10, wherein the spring element comprises a compression spring, a combination of a leaf spring assembly and a plate spring element acting parallel thereto, or a torsion spring.

16. The radial flow machine according to claim 10, wherein the first displacement element has at least three of the first ramp elements and the second displacement element has at least three of the second ramp elements which correspond to the first ramp elements.

17. The radial flow machine according to claim 10, wherein the rotor body is conical and the stator body has a corresponding interior space for receiving the conical rotor body.

18. The radial flow machine according to claim 10, wherein the rotor comprises a first rotor body and a second rotor body.

* * * * *